United States Patent [19]

Mason et al.

[11] Patent Number: 5,356,647
[45] Date of Patent: Oct. 18, 1994

[54] METHOD FOR REDUCING MOISTURE LOSS IN COOKED MEATS

[75] Inventors: Charles R. Mason, Yonkers, N.Y.; Edward C. Coleman, New Fairfield, Conn.; Dalip K. Nayyar, Washingtonville; Sharon R. Birney, Yorktown Heights, both of N.Y.

[73] Assignee: Kraft General Foods, Inc., Northfield, Ill.

[21] Appl. No.: 97,529

[22] Filed: Jul. 27, 1993

[51] Int. Cl.$^5$ .............................................. A23L 1/314
[52] U.S. Cl. ..................................... 426/243; 426/293; 426/296; 426/302; 426/641; 426/644
[58] Field of Search ............... 426/293, 296, 302, 641, 426/644, 652, 241, 243, 92, 646

[56] References Cited

U.S. PATENT DOCUMENTS

| | | | |
|---|---|---|---|
| 3,406,081 | 10/1968 | Bauer et al. | |
| 3,792,173 | 2/1974 | Glabe | 426/92 |
| 3,914,445 | 10/1975 | Pavey | 426/641 X |
| 4,640,837 | 2/1987 | Coleman et al. | 426/302 X |
| 4,746,522 | 5/1988 | Wofford et al. | 426/243 |
| 4,882,184 | 11/1989 | Buckholz et al. | 426/243 |
| 4,904,490 | 2/1990 | Buckholz, Jr. et al. | 426/243 |
| 4,963,708 | 10/1990 | Kearns et al. | 426/243 X |
| 4,985,261 | 1/1991 | Kang et al. | 426/243 |
| 5,053,236 | 10/1991 | Parliment et al. | 426/234 |
| 5,069,916 | 12/1991 | Buckholz et al. | 426/243 |

FOREIGN PATENT DOCUMENTS 1367566 9/1974 United Kingdom ................ 426/293

*Primary Examiner*—Arthur L. Corbin
*Attorney, Agent, or Firm*—Thomas R. Savoie; Thomas A. Marcoux

[57] ABSTRACT

The present invention relates to a method of reducing moisture loss in a cooked meat and intensifying the flavor impact of seasoning applied to the surface of the meat by coating the surface of the meat with glycerol, applying seasoning to the coated surface and cooking the coated, seasoned meat. In addition, the present invention relates to a coating combination which when coated onto a meat and then cooked imparts to the cooked meat a moist and marinated-like flavor, about the coating combination consisting of about 20 to about 33% by weight glycerol and about 67 to about 80% by weight seasoning, the weight percent being of the combination.

15 Claims, No Drawings

METHOD FOR REDUCING MOISTURE LOSS IN COOKED MEATS

BACKGROUND OF THE INVENTION

1. Field of the Invention

This invention relates generally to a method of treating meat prior to cooking which, when cooked, either in a conventional or microwave oven, results in a cooked product having less moisture loss and a greater retention of flavors than a non-treated product. The present invention also relates to a coating combination which when applied onto a meat product and then cooked imparts to the resultant cooked product a moist, marinated-like flavor. The coating combination of the present invention typically comprises from about 20 to about 33% by weight glycerol and from about 67 to about 80% by weight seasoning, with the weight percent being based on the combined weight of the glycerol and seasoning. More particularly, the present invention relates to the use of glycerol and its application to a meat in order to reduce the normal amounts of moisture loss incurred during cooking, as well as to enhance the flavor impact of seasonings applied to the meat before cooking. Due to the intensification of the flavor impact of the applied seasonings provided by the methods and coating combination of the present invention, a meat product may be sufficiently seasoned with the use of a lower amount of the seasoning than is normally required.

2. Description of the Prior Art

Two of the most important characteristics of a meat for the consumer are the meat's juiciness and flavor upon serving. It is well known to anyone who has cooked a piece of meat that upon cooking, meat loses moisture and undergoes a substantial weight loss which results in an obvious shrinkage of the cooked meat product. The total moisture loss in a meat, due to the cooking out of the natural meat juices, is an inevitable consequence of the cooking process and largely depends on the degree of cooking. This fact is evidenced by the simple comparison of the juiciness between a very rare steak and that of a well cooked steak.

Various and numerous methods have been employed over the years in attempts to guard against the moisture loss which is encountered in cooking meats. One such method, which became a standard practice throughout the meat industry, involved a method by which various brine solutions were injected into uncooked meats. These brine solutions, such as aqueous solutions of sodium chloride and one or more phosphate salts, would particularly inhibit and compensate for excessive moisture loss incurred during cooking. For example, an untreated beef roast will characteristically lose between about 25 to about 30% of its pre-cooked weight when subjected to normal cooking conditions. However, a beef roast having a pre-cooked weight of ten pounds and which is injected, prior to cooking, with a one pound brine solution comprising 0.825 pounds of water, 0.125 pounds of sodium chloride and 0.050 pounds of sodium tripolyphosphate, will weigh approximately ten pounds after proper cooking. Consequently, the weight of the cooked meat product treated with the brine solution reflects a moisture loss of approximately 10%, an amount considerably less than the normal 25 to 30% moisture loss generally incurred.

A similar composition is disclosed in U.S. Pat. No. 4,746,522 to Wofford, et al., which is directed to a composition and method for treating meat to reduce moisture loss during cooking. The composition which is dispersed into the meat product is a briny slurry and is comprised of non-halogenated water, acetic acid, gelatin, starch, sodium chloride and one or more phosphate salts.

However, the use of brine solutions and brine slurries in reducing moisture loss in cooked meats is an involved and specific process, requiring the use of complicated and special equipment. In addition, an uneven distribution of the brine solution can cause color, flavor and texture problems in the meat. Accordingly, it would be preferable to find an alternative method for reducing moisture loss in meats, one which is simpler and easier to employ.

Aside from moisture loss in a cooked meat product, it is also critical to the consumer, as mentioned above, that the product has a pleasant taste to it. Raw meat, as it is well known, has no particular appealing flavor. It is only during the various processes of cooking that a meat flavor is developed through the combined effect of the chemicals produced from the thermal degradation of the meat components. Although a certain meat flavor is acquired by the meat during the cooking process, it has become quite popular to use one or more various seasonings to further enhance the taste and flavor characteristics of a cooked meat product.

Seasonings are used in the food industry in almost every product category, with processed meats being one of the major users of seasonings. With the proper choice of spices and/or flavoring agents, a myriad of flavor possibilities exist which can be imparted onto a meat product.

Depending upon the ultimately desired flavor or taste, the type of meat product, and the overall desired effect, varying amounts of seasoning is required. For example, if the meat is to possess a certain flavor throughout the product, the meat will generally have to be marinated. Marination is a process whereby a meat is allowed to soak in a seasoned solution for a period of time, allowing the meat to be enriched by the flavor of the marinade which penetrates the meat product. Such a process not only requires additional time in excess of the normal cooking time required, but also requires excessive amounts of seasonings. It would be preferable to have a method that results in a flavorable impact on meat, and most preferably, a marination effect on meat, that uses a minimum amount of seasoning and which can be accomplished in less time.

Propane-1, 2, 3-triol, or as it is more commonly known, glycerol, a trihydric alcohol, is a clear, water-white, viscous, hygroscopic liquid with a sweet taste at ordinary room temperatures. Glycerol occurs naturally in combined form as glycerides in all animal and vegetable fats and oils, and may be recovered as a by-product upon the saponification of these fats and oils in the process of manufacturing soap. Glycerol can also be obtained from the direct splitting of fats in the production of fatty acids. Commercially, glycerol has been produced since the late 1940's by synthesis from propylene.

The various uses of glycerol number in the thousands and include use in the manufacture of synthetic resins and ester gums, drugs, cosmetics and toothpastes. Tobacco processing, as well as foods, also account for large uses of glycerol. Glycerol as a food is easily digested and nontoxic. It's metabolism places it in the same category as carbohydrates, although it is present in combined form in all vegetable and animal fats. In flavoring and coloring products, glycerol acts as a solvent and its viscosity gives body to the product. Glycerol has been known to be used as a solvent, a moistening agent and as a vehicle for syrups. The uses of glycerol, however, in relation to meat products, and especially in relation to the problems sought to be solved by the present invention, are few.

U.S. Pat. Nos. 4,882,184; 4,904,490 and 5,069,916 (all to Buckholz, et al.) disclose the use of glycerine in microwave cooking. However, the glycerine is used for raising the dielectric constant of the surface of a foodstuff to be cooked. It is also disclosed that browning of the meat is enhanced through the use of dextrose and vinegar powder.

U.S. Pat. No. 5,053,236 to Parliment et al. discloses the use of glycerol in an aroma-generating flavor composition for a food and/or package which is subjected to microwave radiation.

SUMMARY OF THE INVENTION

The present invention relates to the use of glycerol in a method for treating meat, which is to be cooked either in a conventional or microwave oven. The glycerol, used in combination with a minimum amount of seasoning, produces a meat product which not only maintains more of its moisture than a non-treated meat product, but which also has the impact of the seasoning enhanced, allowing for the use of less seasoning but still producing a very flavorable product. Moreover, the method of the present invention results in the cooked meat product having the characteristics of a marinated meat. That is, the flavor or seasoning penetrates the cooked meat product and the consumer is given the impression of the effects of marination.

DETAILED DESCRIPTION OF THE INVENTION

The present invention relates to a method of reducing moisture loss in a cooked meat, while also intensifying the flavor impact of seasonings applied to the surface of a meat, comprising the steps of coating the surface of the meat with glycerol, applying seasoning to the glycerol-coated surface of the meat and cooking the seasoned meat.

In an alternative embodiment of the present invention, glycerol and the desired seasoning are combined to form a slurry which is then coated onto the surface of the meat product prior to cooking.

Both methods are successful whether the meat product is cooked in a conventional oven or a microwave oven.

The present invention is also directed to a coating combination which when applied onto a meat product and cooked results in a moist, marinated-like flavored product, comprising from about 20 to about 33% weight glycerol and from about 67 to about 80% by weight seasoning, weight percent being of the combination.

The term "meat", as defined herein, refers to all types of animal protein, including beef, pork, lamb, poultry and fish. The term "cooked", as used herein, unless otherwise indicated, refers to both conventional oven cooking as well as microwave cooking. The microwave cooking process can be accomplished in various ways and includes cooking the meat product on an open plate as well as cooking the meat product in a microwave susceptor bag. The use of susceptor bags in the art of microwaving is well known. A five panel susceptor bag which can be utilized by the present invention has been previously described in coassigned U.S. Pat. No. 5,227,599, the contents of which are incorporated herein by reference. With the use of a susceptor bag, partial shielding of the meat occurs. Susceptor surfaces generally reach temperatures of about 400° to about 450° F. during microwaving.

Through the use of low levels of glycerol, a low amount of seasoning can be applied to a raw meat which when cooked, results in both flavor penetration being maximized and flavor loss being minimized. While the exact mechanism is not completely understood, it is believed that the seasoning becomes encapsulated and protected by the glycerol during cooking, resulting in the minimization of flavor loss. The use of glycerol also allows penetration of the seasoning into the meat during the cooking process and accounts for the marinade effect, i.e. the taste perception to the consumer that the flavor has penetrated the meat. In addition to the flavoring impact, although the seasoned meat is exposed to high temperatures for long periods of time during the cooking process, the meat still maintains good moisture retention and results in a flavorable and juicy product which is pleasing to the consumer.

The term "glycerin" applies to the purified commercial products normally greater than or equal to 95% glycerol. Several grades of glycerin are available commercially. The grades differ somewhat in their glycerol content and in other characteristics such as color, odor and trace impurities. The term "glycerol", as used herein, includes the various glycerin grades.

In accordance with the present invention, only a low amount of glycerol is required to obtain the desired results of flavor enhancement and moisture retention. Preferably, glycerol is present in the amount of 0.2% to about 3.0% of the raw meat weight with levels as low as 0.5% to 1.5% of the raw meat weight being typical. When glycerol was applied to the meat at levels of greater than about 3% by weight of the raw meat, flavor problems are likely to result.

Seasonings or seasoning blends are defined herein as generally dry mix products containing one or more of spices, flavoring agents, and functional ingredients such as salts, sugars and starches which enhance or provide flavor to a food item. The seasonings of the present invention can also be liquid in nature, such as a marinade seasoning blend or gravy mix.

Some of the more common seasoning flavors for meat products include spices such as coriander, allspice, anise, bay, black pepper, cassia, clove, fennel, garlic, ginger, nutmeg, paprika, red pepper, sage and the like. In addition to one or more spices, salt, dextrose, sugar, acid (e.g., powdered vinegar and/or citric) and sodium erythorbate are generally included in seasoning formulations as well.

Ethnic food products have also increased in popularity and Table I lists five of the more common ethnic seasonings and the basic flavors required to create them. By first formulating a starting product, such as a basic marinade, with the proper amount of salt, hydrolyzed vegetable protein, monosodium glutamate, sugar and phosphate, the flavors listed on Table I can be added and balanced to produce the desired taste sensation of the finished product. It should be noted that formulation work generally uses not only the natural spices for flavor but also oleoresins, essential oils and soluble spices to produce the seasoning blend with the exact flavor profile desired.

TABLE I—VARIOUS ETHNIC SEASONINGS

A. Italian: Oregano, basil, marjoram, garlic, fennel, anise, red pepper, tomato.
B. Mexican: Chili pepper, cumin, oregano, onion, garlic, red pepper, paprika, cinnamon.
C. Cajun: Red pepper, white pepper, black pepper, thyme, oregano, garlic, onion, paprika, green bell peppers.
D. Chinese: Ginger, garlic, soy sauce solids, sherry wine flavor, sweet, acidic, red pepper, five-spice blend.
E. Indian: Cumin, coriander, fenugreek, cardamom, red pepper, black pepper, bay, onion, garlic.

The present invention is not restricted to any particular seasoning or seasonings. Thus, any type of seasoning can be employed in the present invention, whether it be made from the start by the preparer or whether it be an already-prepared seasoning mix. Whatever the seasoning, the flavor impact of said seasoning will be enhanced and a greater flavoring sensation will be achieved with the use of less seasoning than that required for a non-treated product.

In accordance with the present invention, the seasoning or seasoning blend is applied to the meat at a level of about 0.5% to about 7% by weight of the raw meat. More preferably, the seasoning blend is applied to the meat in an amount from about 1% to about 5% by weight of the meat with an amount of about 2% to about 4% by weight of the meat being most preferred.

In another embodiment, a coating combination of the present invention is applied to the meat product, comprising from about 20 to about 33% by weight glycerol, preferably about 25%, and from about 67 to about 80% by weight seasoning, preferably about 75%, the weight percent being based on the combination.

It has surprisingly been found that through the methods of the present invention, by applying a minimum amount of glycerol in combination with a minimum amount of seasoning, a cooked meat may be obtained which is extremely moist and flavorable as compared to an untreated piece of meat. In addition, the method of the present invention also provides an internal seasoning flavor to the cooked meat as if the meat had been marinated. Even further, an intense seasoning flavor is obtained even though the amount of seasoning used would not be expected to result in such a taste or flavoring impact. Even further, the use of minimum amounts of glycerol in combination with seasoning in accordance with the present invention have a powerful impact on the flavor enhancement of the meat and the retention of moisture. The use of glycerol in combination with the seasoning ingredients also promotes microwave browning of the meat, such as chicken, resulting in an overall appearance similar to oven baked or oven broiled meat.

The following examples are provided to further illustrate the present invention.

EXAMPLE 1

A seasoning mix or blend was prepared by weighing and dry blending the following ingredients in a poly bag.

| SEASONING FORMULA | |
|---|---|
| INGREDIENT | % |
| sugar | 26.07 |
| salt | 24.07 |
| vinegar powder (12% vinegar, min.) | 18.10 |
| garlic powder | 11.22 |
| onion powder | 9.23 |
| dextrose | 9.05 |
| black pepper | 2.26 |
| | 100.00 |

A 127 g skinless chicken breast was washed and towel dried. 1 g of glycerol (0.79% by weight of the raw chicken) was painted onto the top surface of the chicken, sufficiently covering the surface. 3 g of the above seasoning mix (2.36% by weight of the raw chicken) was then uniformly sprinkled onto the glycerol coated surface of the chicken. The seasoning mix almost immediately incorporated itself into the glycerol, eliminated the dry powder appearance of the seasoning mix and resulting in a marinated-type appearance on the chicken. The seasoned chicken breast was placed into a microwave susceptor bag (having five susceptor panels). The bag was closed, placed in a microwave oven and cooked on high power for eight minutes. The cooked chicken was extremely moist, flavorable and tenderized, with a conventional oven-baked or oven-broiled, lightly browned cooked appearance.

The seasoning blend identified above was developed to mask the glycerol flavor and the cooked chicken had no off flavors. It was further noted that the spice flavor penetrated the chicken providing the cooked meat with a seasoned internal flavor analogous to a marinated meat.

It was also noted that, considering the minimum amount of seasoning used, the cooked chicken exhibited a high flavor intensity of the seasoning.

EXAMPLE 2

3 g of the seasoning mix of Example 1 was combined with 1 g of glycerol to form a slurry. A 129 g skinless chicken breast was washed and towel dried and the slurry was coated onto the top surface of the chicken, sufficiently covering the surface. The coated chicken breast was placed into a microwave susceptor bag, the bag closed and placed in a microwave oven and cooked on high power for eight minutes. Similar to the cooked product of Example 1, the cooked chicken was extremely moist, flavorable and tenderized, with a conventional oven-baked or oven-broiled, lightly browned cooked appearance.

EXAMPLES 3-22

In an attempt to identify the mechanism causing or leading to moisture retention in the method of the present invention, weight (moisture) loss was evaluated in various skinless chicken samples which were prepared with the various indicated key components of the marinate system of the present invention. The results are given in Table I.

In interpreting the results shown in Table I, it can be seen that the average percent moisture loss of the chicken which was microwaved in a susceptor bag without any treatment (Exs. 3-5) was 24.7% and the chicken which was microwaved on an open plate without any treatment (Ex. 19) had a 46.4% moisture loss.

When glycerol alone was applied to the chicken (Exs. 13 and 20), moisture loss was not considerably effected. When the chicken was prepared with both glycerol and seasoning (Exs 6-12) the average percent moisture loss was 20.12%, which translates into a 18.54% reduction in moisture loss compared to the untreated chicken (Exs. 3-5)

It is further noted that when salt alone was applied to the meat (Exs. 14 and 21), or when vinegar powder alone was applied to the meat (Ex. 15), a reduction in moisture loss was seen. However, when glycerol was used in combination with a minimum amount of salt and/or acid (e.g. vinegar powder), moisture loss reduction was greater than with the use of the salt or acid alone. Moisture loss, with the use of a combination of glycerol with salt and/or vinegar and/or seasoning, was reduced by about 20 to about 50% as compared to the untreated chicken (Exs. 16 and 17 had an average moisture loss of 17.25%—a 30.17% reduction in moisture loss compared to the untreated chicken; Ex. 18 represented a 40.49% reduction in moisture loss compared to the untreated chicken; and Ex. 22 represented a 49.49% reduction in moisture loss compared to the untreated chicken). Ex. 22, which represented the combination of glycerol together with seasoning which contained both salt and vinegar powder, had the greatest reduction in moisture loss as compared to an untreated product.

consisting of 81.94% crumb component and 18.06% seasoning component was employed with the seasoning component formulated as follows:

| Ingredient | Parts By Weight |
| --- | --- |
| Dextrin - 10DE | 8.90 |
| Salt | 4.55 |
| Barbecue Flavor | 3.79 |
| Smoke Flavor | 0.55 |
| Beet Powder | 0.27 |
| | 18.06 |

Twenty grams of the coating mix (containing 3.61 g seasoning component) was placed in a susceptor cooking bag. Two skinless chicken breasts were dampened with water and also placed into the bag which was then closed and shaken. The bag was opened; the chicken breast was arranged skinned side up; the bag was re-closed; and the bag was microwaved for 12 minutes and high power.

One gram of glycerol was applied to the top surface of each of two skinless chicken breasts. 3.69 g of the above-identified seasoning blend was then sprinkled evenly onto the top surface of the chicken. It was noted that the seasoning combined with the glycerol. 16.39 g of the crumb component employed above was then sprinkled over the glycerol-coated chicken which was

TABLE I

MOISTURE LOSS OF RAW CHICKEN MEAT

| Preparation | Ex. No. | Chicken Wt. (g) | Glycerol (g) | Salt (g) | Seasoning of Example I (g) | Vinegar powder (g) | Wt. Loss (g) | H$_2$O Loss (%) |
| --- | --- | --- | --- | --- | --- | --- | --- | --- |
| A. Microwaved in susceptor bag | 3 | 160 | — | — | — | — | 36.8 | 23.0 |
| | 4 | 386 | — | — | — | — | 99.0 | 25.7 |
| | 5 | 497 | — | — | — | — | 121.0 | 25.4 |
| | 6 | 207 | 1 | — | 3 | — | 28.1 | 13.6 |
| | 7 | 175 | 1 | — | 3 | — | 34.1 | 19.1 |
| | 8 | 132 | 1 | — | 3 | — | 29.1 | 21.9 |
| | 9 | 182 | 1 | — | 3 | — | 42.0 | 22.6 |
| | 10 | 182 | 1 | — | 4 | — | 40.6 | 21.8 |
| | 11 | 507 | 3 | — | 12 | — | 108.5 | 21.4 |
| | 12 | 182 | 1 | — | 5 | — | 38.1 | 20.5 |
| | 13 | 160 | 1 | — | — | — | 44.0 | 27.0 |
| | 14 | 213 | — | 1 | — | — | 27.0 | 16.9 |
| | 15 | 439 | — | — | — | 1.6 | 90.0 | 20.5 |
| | 16 | 459 | 3 | — | — | 1.6 | 85.0 | 18.5 |
| | 17 | 476 | 3 | — | — | 1.6 | 76.0 | 16.0 |
| | 18 | 477 | 3 | 3 | — | — | 70.0 | 14.7 |
| B. Microwaved on plate | 19 | 156 | — | — | — | — | 72.4 | 46.4 |
| | 20 | 156 | 1 | — | — | — | 66.8 | 42.0 |
| | 21 | 180.8 | — | 1 | — | — | 51.8 | 28.5 |
| | 22 | 180.4 | 1 | — | 3 | — | 44.1 | 23.9 |

Although vinegar powder, i.e. acetic acid, was used in Examples 15-17 and 22, citric acid or any other acceptable food acid could also be employed by the present invention.

It is noted that as Examples 3-5, 14, 15, 19 and 21 did not use glycerol, these examples are truly comparative in nature to the other examples and should be recognized as such.

Although not indicated in Table I, all examples employing the use of glycerol together with some type of seasoning resulted in cooked meats which retained a high level of flavor of the seasonings and moreover, gave the cooked meat a marinated-like flavor.

EXAMPLE 23

The following experiment was conducted to establish the retention of flavors during cooking using the glycerol coating technique of this invention. A coating mix then placed in a susceptor bag, skinned side up, and microwaved for 12 minutes at high power as above.

The glycerol-coated chicken was found to be much more flavorful, having about twice the spice impact of the control chicken. Further in the case of the glycerol-coated chicken, the flavor was found to have penetrated throughout the meat.

EXAMPLE 24

The utility of the invention in conventional ovens was established by cooking four chicken cutlets on a foil-lined baking sheet for 17 minutes at 400° F. (204.4° C.). Two cutlets were first coated with one gram of glycerol each and then sprinkled with three grams each of an Italian seasoning blend. The glycerol-treated cutlets were found to be quite flavorful.

The above preferred embodiments and examples are given to illustrate the scope and spirit of the present invention. The embodiments and examples described herein will make apparent, to those skilled in the art, other embodiments and examples. These other embodiments and examples are within the contemplation of the present invention. Therefore, the present invention should be limited only by the appended claims.

What is claimed is:

1. A method of reducing moisture loss and enhancing the flavor impact of surface-applied seasonings in a cooked meat consisting essentially of:

coating the meat with a coating combination by first coating the meat surface with gylcerol; and then applying a season coating to the coated surface of the meat; and cooking the coated, seasoned meat, the coating combination consisting of from about 20 to 33% glycerol and from about 67 to 80% seasoning.

2. The method according to claim 1 wherein said meat is poultry.

3. The method according to claim 1 wherein said glycerol is applied to the surface of the meat in an amount of from about 0.2 to about 3.0% by weight of the meat.

4. The method according to claim 3 wherein said glycerol is applied to the surface of the meat in an amount of from about 0.5% to about 1.5% by weight of the meat.

5. The method according to claim 1 wherein said seasoning is a powdered seasoning blend.

6. The method according to claim 1 wherein said seasoning is a liquid seasoning blend.

7. The method according to claim 1 wherein said seasoning blend is applied to the coated surface of the meat in an amount of about 2 to about 4% by weight of the meat.

8. The method according to claim 1 wherein the coated, seasoned meat is cooked in a microwave oven.

9. The method according to claim 8 wherein the coated, seasoned meat is placed in a susceptor bag prior to being cooked in said microwave oven.

10. A method of reducing moisture loss and enhancing the flavor impact of surface-applied seasonings in a cooked meat consisting essentially of the steps of:

(a) combining glycerol and seasoning in an amount sufficient to form a slurry, (b) coating the surface of the meat with the slurry, said slurry consisting of from about 20 to 33% gylcerol and from about 67 to 80% seasoning, and (c) cooking the meat.

11. The method according to claim 10 wherein said meat is poultry.

12. The method according to claim 10 wherein said glycerol is used in the amount of from about 0.2 to about 3.0% by weight of the meat.

13. The method according to claim 10 wherein said seasoning is used in the amount of from about 2 to about 4% by weight of the meat.

14. The method according to claim 10 wherein the coated meat is cooked in a microwave oven.

15. The method according to claim 14 wherein the coated meat is placed in a susceptor bag prior to being cooked in said microwave oven.

* * * * *